(12) United States Patent
Bruch et al.

(10) Patent No.: US 9,409,722 B2
(45) Date of Patent: Aug. 9, 2016

(54) TRANSPORT STAR FOR CONTAINERS, CONTAINER TRANSPORT SECTION, AND SYSTEM FOR HANDLING CONTAINERS

(71) Applicant: KHS GmbH, Dortmund (DE)

(72) Inventors: Bernd Bruch, Weinsheim (DE); Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/422,056

(22) PCT Filed: Jul. 27, 2013

(86) PCT No.: PCT/EP2013/002230
§ 371 (c)(1),
(2) Date: Feb. 17, 2015

(87) PCT Pub. No.: WO2014/026732
PCT Pub. Date: Feb. 20, 2014

(65) Prior Publication Data
US 2015/0232283 A1  Aug. 20, 2015

(30) Foreign Application Priority Data

Aug. 15, 2012  (DE) .................... 10 2012 016 124

(51) Int. Cl.
| B65G 47/22 | (2006.01) |
| B65G 45/22 | (2006.01) |
| B65G 47/84 | (2006.01) |
| B29C 49/42 | (2006.01) |
| B29L 31/00 | (2006.01) |

(52) U.S. Cl.
CPC ............ *B65G 45/22* (2013.01); *B29C 49/4273* (2013.01); *B65G 47/846* (2013.01); *B29C 2949/00* (2013.01); *B29L 2031/7158* (2013.01)

(58) Field of Classification Search
CPC ...................................................... B65B 31/022
USPC .......................... 198/493; 53/110; 141/85, 89
See application file for complete search history.

(56) References Cited

U.S. PATENT DOCUMENTS

| 2,620,111 A * | 12/1952 | Hohl | ....................... B65B 31/04 141/11 |
| 2,630,957 A * | 3/1953 | Hohl | ....................... B65B 31/00 235/145 R |
| 3,566,575 A * | 3/1971 | Lisiecki | ................ B67C 7/0073 141/92 |
| 5,081,953 A * | 1/1992 | Guthrie | ................. C23C 16/453 118/715 |

(Continued)

FOREIGN PATENT DOCUMENTS

| DE | 93 11 106 | 9/1993 |
| DE | 299 06 070 | 9/1999 |

(Continued)

*Primary Examiner* — William R Harp
(74) *Attorney, Agent, or Firm* — Occhiuti & Rohlicek LLP (57) ABSTRACT

An apparatus for conveying containers includes a transport star having a rotor that rotates around a machine axis, transport positions disposed around the star, and a laminar-flow system. Each transport position has a container carrier to hold a container. The laminar-flow system, which is above the container carriers and above the containers' trajectory, prevents container contamination while the containers are disposed on the transport positions. The laminar-flow system has openings that direct a stream of sterile medium downward along outer surfaces of the containers.

16 Claims, 7 Drawing Sheets

(56) References Cited

U.S. PATENT DOCUMENTS

| | | | | |
|---|---|---|---|---|
| 6,668,877 B2* | 12/2003 | Fehland | ............... | B67C 3/04 141/47 |
| 7,832,185 B2* | 11/2010 | Mastio | ............... | A61L 2/082 250/492.3 |
| 8,132,598 B2* | 3/2012 | Mastio | ............... | A61L 2/082 141/5 |
| 8,479,782 B2* | 7/2013 | Mastio | ............... | A61L 2/082 141/144 |
| 8,511,045 B2* | 8/2013 | Mastio | ............... | A61L 2/082 250/455.11 |
| 8,567,454 B2* | 10/2013 | Mastio | ............... | A61L 2/082 141/285 |
| 2009/0013645 A1* | 1/2009 | Mastio | ............... | A61L 2/082 53/425 |
| 2009/0013646 A1* | 1/2009 | Mastio | ............... | A61L 2/082 53/425 |
| 2009/0013647 A1* | 1/2009 | Mastio | ............... | A61L 2/082 53/425 |
| 2009/0013648 A1* | 1/2009 | Mastio | ............... | A61L 2/082 53/426 |
| 2009/0017747 A1* | 1/2009 | Wu | ............... | A61L 2/082 454/189 |
| 2009/0277135 A1* | 11/2009 | Mastio | ............... | A61L 2/082 53/425 |
| 2010/0212260 A1* | 8/2010 | Clusserath | ............... | B67B 3/00 53/403 |
| 2011/0023420 A1* | 2/2011 | Mastio | ............... | A61L 2/082 53/471 |
| 2012/0124941 A1* | 5/2012 | Mastio | ............... | A61L 2/082 53/403 |

FOREIGN PATENT DOCUMENTS

| | | |
|---|---|---|
| DE | 103 41 965 | 4/2005 |
| WO | WO2005/056465 | 6/2005 |
| WO | WO2009/009681 | 1/2009 |

* cited by examiner

TRANSPORT STAR FOR CONTAINERS, CONTAINER TRANSPORT SECTION, AND SYSTEM FOR HANDLING CONTAINERS

RELATED APPLICATIONS

This application is the national stage under 35 USC 371 of international application PCT/EP2013/002230, filed on Jul. 27, 2013, which claims the benefit of the Aug. 15, 2012 priority date of German application DE 102012016124.7, the contents of which are herein incorporated by reference.

FIELD OF DISCLOSURE

The invention relates to machines for handling containers.

BACKGROUND

It is known to fill containers while they are arranged in a space that is separated from the environment by a housing. It is also known to expose the containers to laminar flow of sterile air directed from the top down while the containers are in this space. Doing so helps to avoid contamination of the containers with foreign particles, such as dust, germs, or other unwanted substances.

It is also known to have transport sections between container handling machines or assemblies. These container-handling machines convey containers from one container-handling machine to a subsequent container-handling machine along a container-transport direction. A disadvantage of known transport sections is that any empty containers, or containers that have bee filled but not yet sealed, remain un protected against contamination while being transported along a transport section.

SUMMARY

The invention features a transport star that is used as part of a container transport section that avoids contamination of the containers during their transportation on the container transport section and also during their transfer to and removal from the container transport section.

According to the invention, discharge openings form a laminar current or flow of a sterile medium. The sterile medium can be a sterile vaporous medium or gaseous medium, or it can be a sterile fluid or sterile air. The laminar current circulates with the transport star or with its rotor. The containers are also then exposed to the sterile medium when they are conveyed by the transport star or on the container transport section. In systems for handling containers, preferably also in the container handling machines or assemblies, the laminar flow system continues so that, to avoid contamination, the containers are exposed to the laminar flow of the sterile fluid everywhere that they are not yet sealed during transport and/or during handling.

In a preferred embodiment of the invention, the container transport section is part of a system for filling and sealing containers that are manufactured from preforms by blow-molding in the system using a blow-molding machine or by a corresponding assembly. The container transport section between this blow-molding machine and a subsequent filling machine in the direction of transport of the containers or a corresponding filling assembly and also the container transport section between the filling machine and a subsequent sealing machine in the direction of transport of the containers or a corresponding assembly are formed in each case by at least one transport star according with the laminar flow system. The laminar flow system continues in the handling machines or assemblies so that the open containers, at least from the point of transfer from the blow-molding machine through to the sealing machine, are systematically under a laminar flow of the sterile fluid moving with the containers. This tends to prevent contamination of the containers until they are sealed.

As the discharge openings for the sterile fluid or for generating the laminar flow of this fluid are provided on the faceplate rotating with the rotor of the transport star or on a corresponding perforated or laminator panel, it is not necessary to provide this faceplate with discharge openings over its entire surface. Moreover, according to the invention, it is proposed that the discharge openings be concentrated on the transport positions, and preferably in such a way that, there, they form groups of in each case a plurality of discharge openings, which then are arranged preferably in an annular structure around the axis of the relevant transport position oriented parallel to the machine axis.

Due to the arrangement of the discharge openings only on the transport positions, there results a considerable reduction in the consumption of the sterile medium, the flow of which is permanently maintained during the operation of a system including the transport star or the container transport section. In a continuation of the laminar flow system in the container handling machines or assemblies, a faceplate moved with the rotor is preferably in each case provided there too, wherein said faceplate has discharge openings for the sterile fluid only at container handling positions.

In one aspect, the invention features an apparatus for conveying containers. Such an apparatus includes a first transport star, a plurality of transport positions, and a laminar-flow system. The transport star includes a rotor that rotates around a machine axis and has the transport positions disposed around it. Each transport position includes a container carrier to hold a container. The laminar-flow system, which is disposed above the container carriers and above the containers' trajectory, is configured to prevent container contamination while containers are disposed on the transport positions. The laminar-flow system includes outlet openings configured to direct a fluid stream of sterile medium downward along outer surfaces of the containers.

Some embodiments include a faceplate, and a channel. The faceplate rotates with the transport element and the channel supplies and distributes the sterile medium. The outlet openings, which are disposed on the faceplate, are divided into groups, each of extends above at most one transport position.

In other embodiments, the outlet openings are divided into groups, each of which includes a ring of outlet openings. The ring extends above at most a first transport position from the plurality of transport positions, and an axis of the first transport position that is parallel to the machine axis.

Other embodiments include walls defining an annular space that extends along a trajectory of the transport positions. In these embodiments, the outlet openings are disposed in the annular space. In operation, container mouths held in the transport positions extend into the annular space.

In another embodiment, the laminar-flow system includes a channel that has first, second, and third channel sections. The channel supplies and distributes the sterile fluid from a source of the sterile fluid to the outlet openings. The first channel section forms an annular space into which, in operation, container mouths protrude. The third channel section is coaxial with the machine axis. The second channel section is between the first and third channel sections and is oriented to distribute fluid in a radial direction from the third channel section to the first channel section.

Yet other embodiments include a channel for distributing sterile fluid. The channel is formed at least in part between a first wall and a second wall. The second wall rotates with the rotor. The first wall is at a first distance from the machine axis. The second wall is at a second distance from the machine axis, the second distance being less than the first distance.

In another embodiment, the first wall is a stationary wall amounted on a machine rack.

Embodiments also include those that have a channel for distributing sterile fluid. This channel is formed at least in part between a first wall that defines an outer cone having a cone axis that is parallel to the machine axis and a second wall that defines an inner cone that is coaxial with the first cone and that cooperates with the first cone to define an annular gap that is coaxial with the machine axis and with the cone axis and in which the outlet openings are disposed. A base of the outer cone intersects the cone axis at a first point that is a first distance from a vertex of the outer cone. A base of the inner cone intersects the cone axis at a second point that is a second distance from the vertex of the outer cone, the second distance being greater than the first distance. Among these are embodiments that also include an inner circumferential wall and an outer circumferential wall, both of which are coaxial with the cone axis, both of which extend in a direction parallel to the cone axis, and that collectively define an annular space below the annular gap.

In another embodiment, the outer circumferential wall includes openings for enabling passage through the outer circumferential wall in a radial direction. A first opening is located at a transport star inlet, and a second opening is located at a transport star outlet.

In another embodiment, the outlet openings are disposed in a faceplate that is itself disposed on a movable segment that is radially movable relative to the machine axis. The outlet openings can be removed from normal positions thereof above a transport position.

In another embodiment, the container carrier is movable between a first position and a second position. In the first position, the container carrier is arranged at an associated transport position from the plurality of transport positions. In the second position, the container carrier is located outside the associated transport position.

In another embodiment, movement of the container carrier and the segment are configured such that movement of the segment and movement of the container carrier occur together.

Some embodiments include a first container-handling machine, a second container-handling machine, and a container transport section between the first and second container-handling machines. In these embodiments, the transport star is a constituent of the container transport section. Among these are embodiments that also include a second transport star, and a container transfer area, the second transport star being adjacent to the first transport star. The container transfer area is disposed where the first transport star meets the second transport star. The first transport star includes a first faceplate having the outlet openings thereon, and the second transport star includes a second faceplate having outlet openings thereon for discharge of sterile medium. The first faceplate is offset along the machine axis relative to the second faceplate so that when the first faceplate and the second faceplate are concurrently in the container transfer area, the outlet openings in the first faceplate and the outlet openings in the second faceplate align sufficiently to enable passage of sterile air both the outlet openings in the first faceplate and the outlet openings in the second faceplate.

In another embodiment, the first container handling machine is a blow-molding machine and the second container handling machine is selected from the group consisting of a filling machine and a sealing machine.

In another embodiment, the laminar-flow system continues into at least one of the container handling machines.

As used herein, "handling machines" are machines, devices or assemblies for the manufacture and handling of containers, in particular for the blow-molding, sterilization, filling, and sealing of containers.

As used herein, the expressions "substantially" or "approximately" mean deviations from the exact value in each case by ±10%, and preferably by ±5% and/or deviations in the form of changes not significant for function.

As used herein, a "sterile" fluid or medium is a fluid or medium that contains no germs and/or no dirt particles, or so few germs and/or dirt particles and only such germs and/or dirt particles that no harmful effects on the filling material are to be expected taking account the properties of the filling material.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

BRIEF DESCRIPTION OF THE FIGURES

These and other features of the invention will be apparent from the following detailed description, and the accompanying figures, in which.

DETAILED DESCRIPTION

Figure 1:
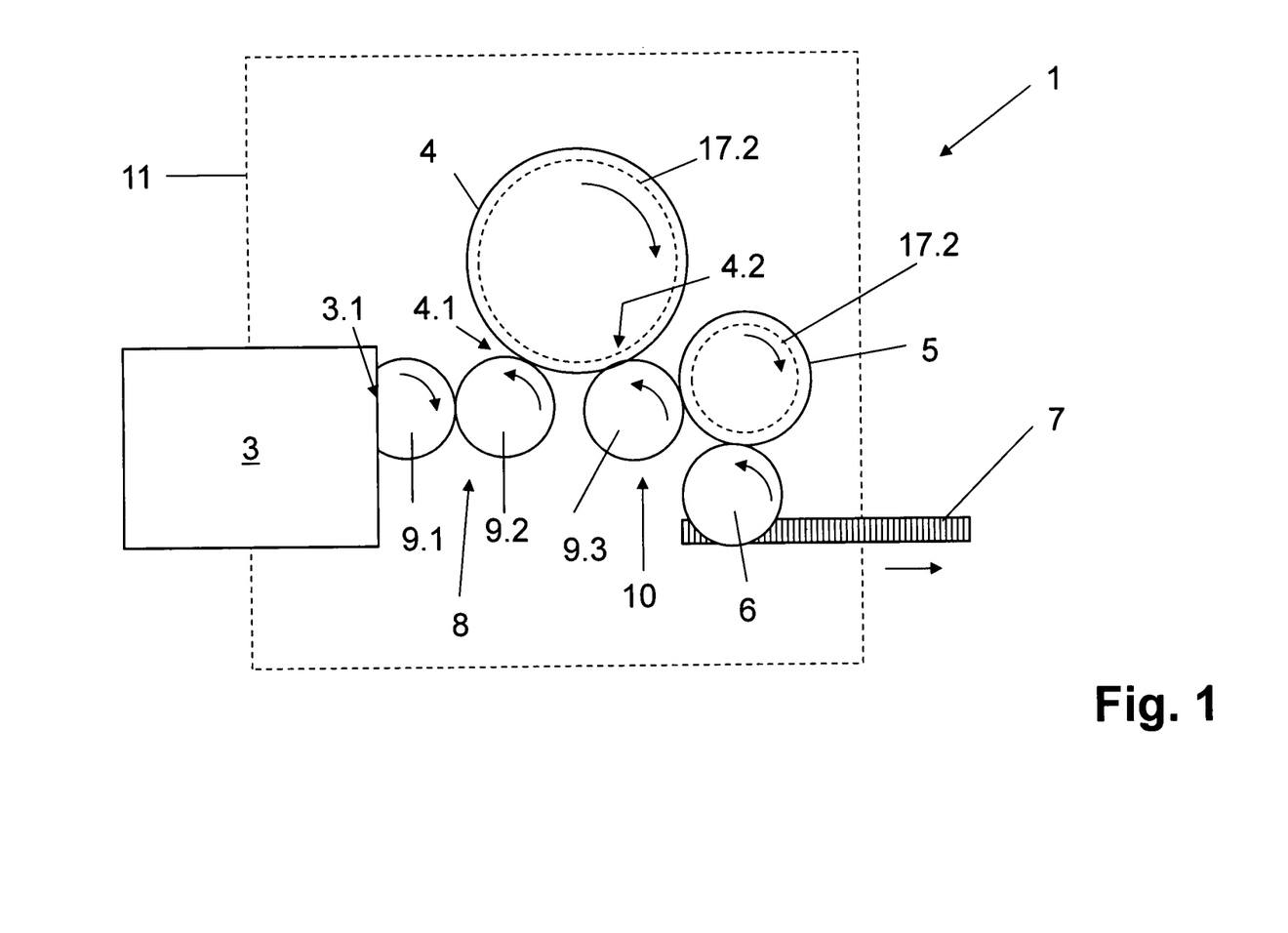
FIG. 1 is a schematic representation of a view from above a system for blow-molding containers, such as plastic bottles, and for filling and sealing these bottles under sterile conditions.

FIG. 1 shows a system 1 for blow-molding, filling and sealing of containers 2 under sterile conditions. Such containers include, in particular, plastic bottles, such as PET bottles The system 1 comprises a blow-molding machine 3 in which the containers 2 are made by blowing using pre-forms, a filling machine 4 for filling the containers 2 with liquid filling material, and a sealing machine 5 for sealing the filled containers 2. An outlet transport star 6 then moves the filled containers 2 to an external conveyor 7. The blow-molding machine 3, the filling machine 4 and the sealing machine 5 are, for example, also blocked assemblies of a complete machine.

A first container-transport section 8 is provided in a container-transport direction between a blow-molding-machine container outlet 3.1 of the blow-molding machine 3 and a filling-machine container inlet 4.1 of the filling machine 4. The first container-transport section 8 is formed by rotor-like first and second transport stars 9.1, 9.2 that are driven to rotate in opposite directions around corresponding vertical first and second machine axes MA1, MA2, as shown in FIG. 2.

A second container-transport section 10 extends from a filling-machine container outlet 4.2 of the filling machine 4 to the sealing machine 5. In the illustrated embodiment, a third transport star 9.3 forms the second container-transport section 10. The third transport star 9.3 is rotationally driven around a third vertical machine axis. The first, second, and third transport stars 9.1-9.3 are preferably identical to each other. The blow-molding machine 3, the filling machine 4, the sealing machine 5 and the first, second, and third transport stars 9.1-9.3 are preferably held within a housing 11 that defines a sterile space separate from the environment.

Figure 2:
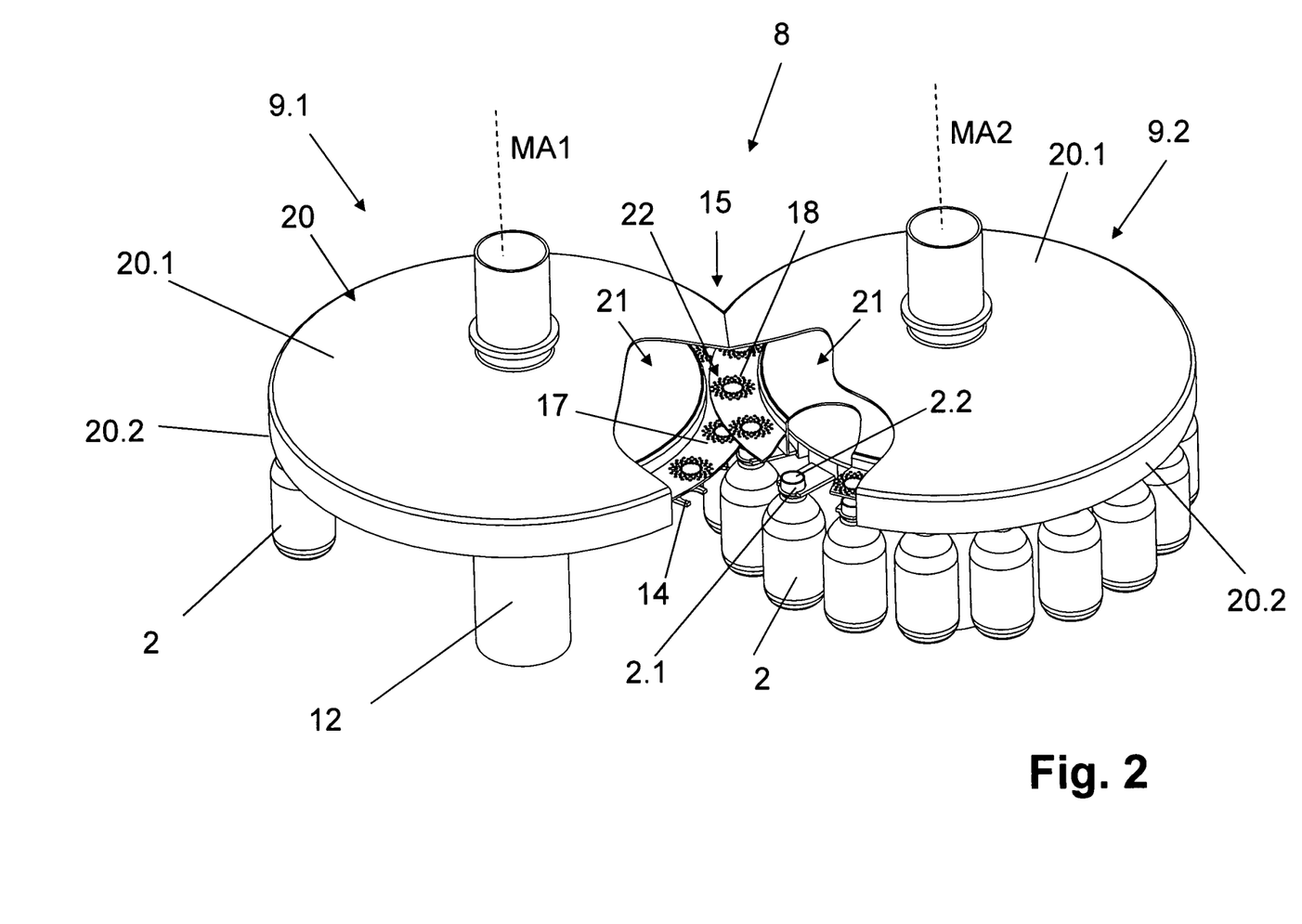
FIG. 2 is a simplified perspective view of two transport stars adjacent to each other in the direction of transport of the containers, the stars being within a container transport section of the system in FIG. 1.
Figure 3:
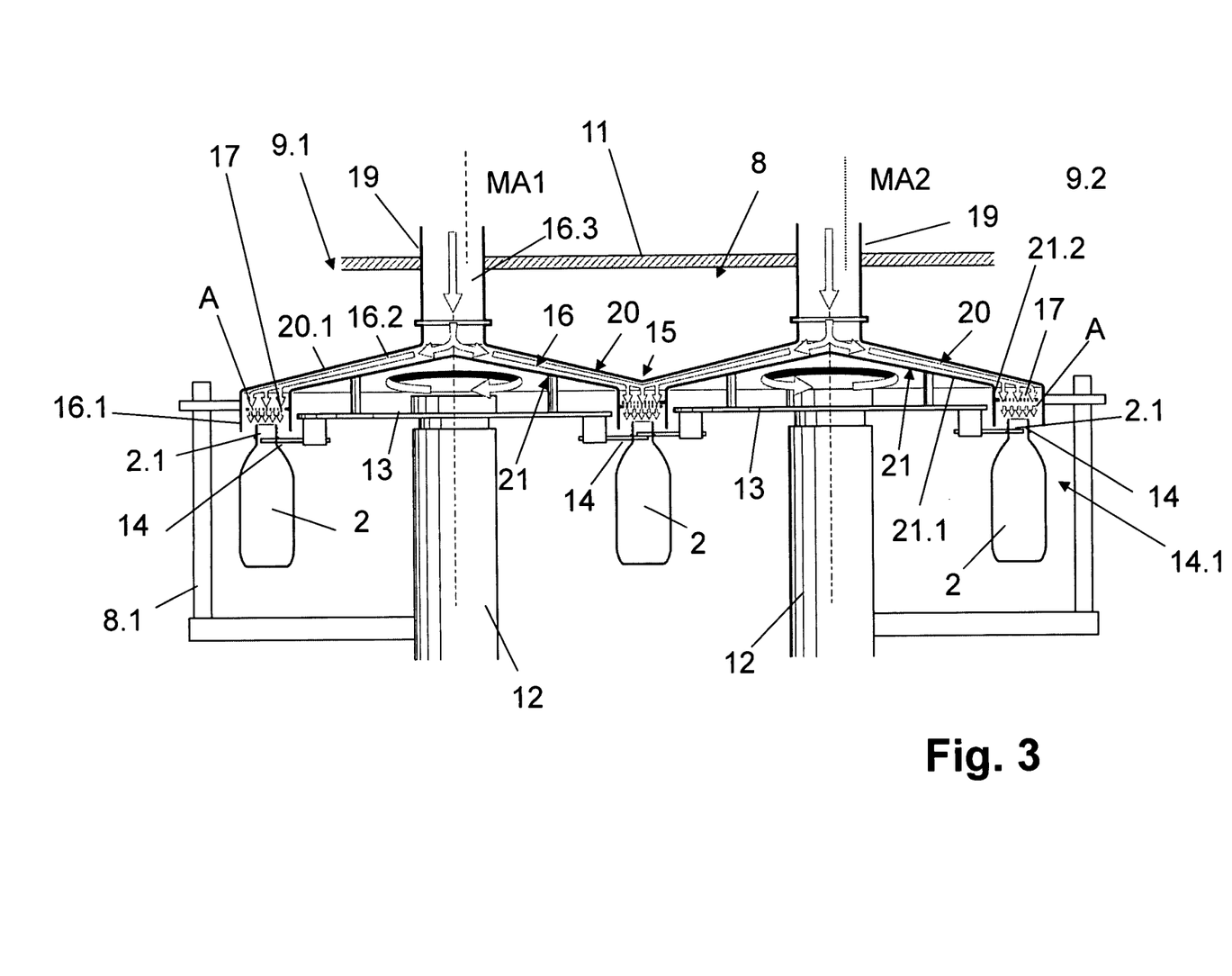
FIG. 3 is sectional view of the two transport stars of FIG. 2.
Figure 4:
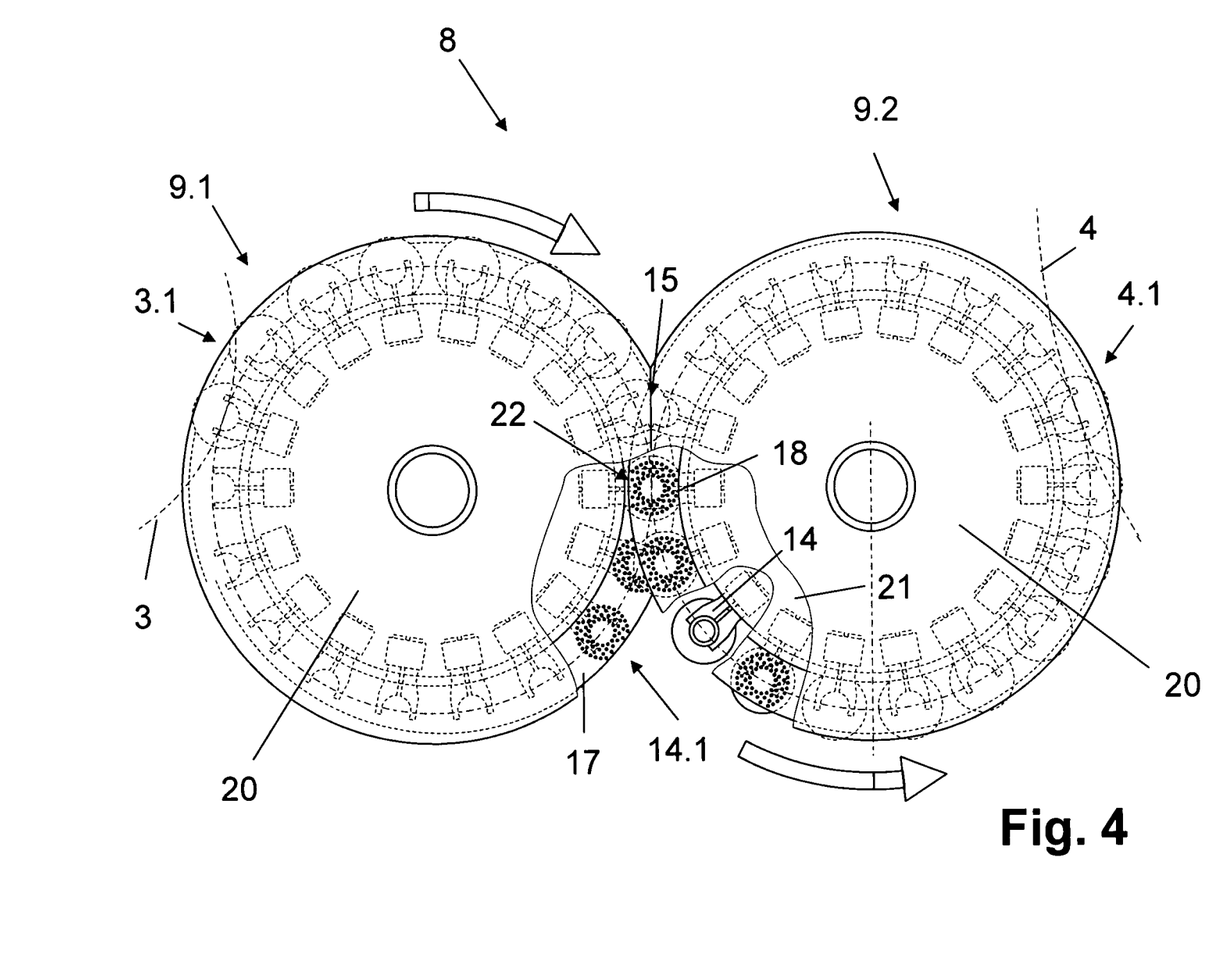
FIG. 4 is a view from above the two transport stars of FIG. 2.
Figure 5:
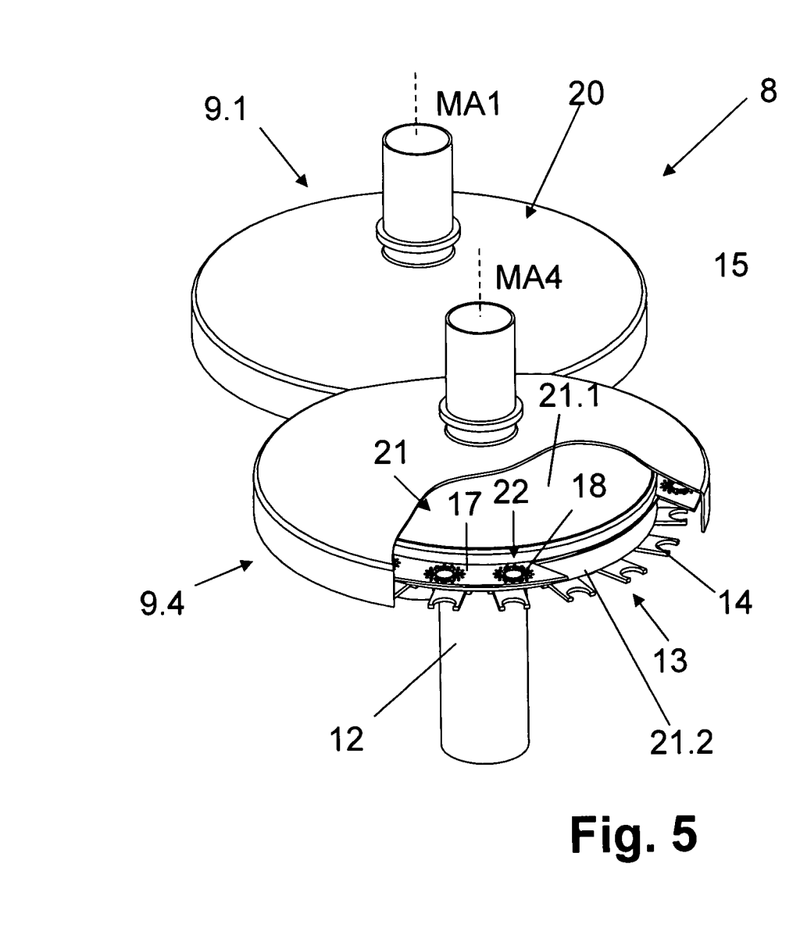
FIG. 5 is a simplified perspective view of a further embodiment in which two transport stars are adjacent to each other in the direction of transport of the containers.

FIGS. 2-4 show the first and second transport stars 9.1, 9.2 forming the first container-transport section 8 in greater detail. As shown in FIG. 3, the first and second transport stars 9.1, 9.1 each have a spoked-wheel rotor 13 that is rotationally driven around the associated first and second vertical machine axes MA1, MA2. Each rotor 13 is mounted on a vertical column 12.

On the circumference of each rotor 13 are tong-like grippers or holding clamps 14. These are distributed at regular angular distances around the first and second machine axes MA1, MA2 and at the same radial distance from the machine axis MA1, MA2. Each holding clamp 14 functions as a container carrier for suspending a container 2 by its container neck 2.1 directly underneath the container mouth 2.2 or on a throat ring, or neck ring, provided there.

To allow a meshing of clamps 14 on the first and second transport stars 9.1, 9.2, and to thus allow containers 2 to be transferred from the first transport star 9.1 to the second transport star 9.2, it is not enough for the rotors 13 of the first and second transport stars 9.1, 9.2 to be driven synchronously and in opposite directions. It is also important for the clamps 14 that are on the first transport star 9.1 and the clamps 14 that are on the second transport star 9.2 to be located on different horizontal levels. As can be seen clearly in FIG. 3, the clamps 14 on the first transport star 9.1 are arranged on a horizontal level that lies slightly below the horizontal level of the clamps 14 on the second transport star 9.2.

To transport containers 2 along the first container-transport section 8 under sterile conditions, and in particular to avoid penetration of foreign particles, such as dirt and/or germs, into the containers 2 that have just been made in a sterile manner in the blow-molding machine 3, the containers 2 are exposed, during transport along the first container-transport section 8, to a laminar flow system that constantly provides laminar flow of a sterile fluid oriented from the top down as is indicated in FIG. 3 by the arrows A. A suitable sterile fluid is sterile air.

As shown in FIG. 3, the laminar flow system includes a channel 16 for the supply and distribution of the sterile fluid. The channel has a distal channel section 16.1 just above the trajectory of the clamps 14 that hold the containers 2. The distal channel section 16.1 forms an annular space that is concentric with and surrounds the corresponding first or second machine axis M1, M2. When held by a clamp 14, the container neck 2.1 extends into this annular space. A laminator panel 17 is arranged just above the trajectory of the container mouths 2.2. As shown in FIG. 2, the laminator panel 17 is a perforated panel that has openings 18 for the sterile fluid.

Referring again to FIG. 3, the channel 16 furthermore forms a mid-channel section 16.2 and a proximal channel section 16.3 through which sterile fluid is continuously supplied during operation. The mid-channel section 16.2 and proximal channel section 16.3 are arranged to be concentric with the particular first or second machine axis MA1, MA2. The proximal channel section 16.3 is made substantially from one pipe 19. The mid-channel section 16.2 extends radially away from the first or second machine axis MA1, MA2 and diagonally downwards from its junction with the proximal channel section 16.3 between an upper hood 20 and a lower hood 21 connected to the relevant rotor 13.

As shown in FIG. 3, a machine rack 8.1 supports the upper hoods 20. Within a transfer area 15 between the first and second transport stars 9.1, 9.2, the upper hoods 20 corresponding to the adjacent first and second transport stars 9.1, 9.2 transition into each other to form a connection between them. Each upper hood 20 has an upper-hood conical wall section 20.1 that is coaxial with its corresponding first or second machine axis MA1, MA2. The upper-hood conical wall section 20.1 transitions into the pipe 19 that forms the distal channel section 16.3.

As shown in FIG. 2, an upper-hood peripheral wall section 20.2 extends downward from the upper-hood conical wall section 20.1 and encloses the corresponding first or second machine axis MA1, MA2. The upper-hood peripheral wall section 20.2 is interrupted at the transfer area 15 and at a container inlet and container outlet of the first container-transport section 8. In the illustrated embodiment, these correspond to the blow-molding machine container outlet 3.1 and the filling-machine container inlet 4.1.

Each lower hood 21 comprises a lower-hood conical wall section 21.1 that is coaxial with the corresponding first or second machine axis MA1, MA2. Each lower hood 21 also has a lower-hood peripheral wall 21.2 that defines an annulus surrounding its corresponding machine axis MA1, MA2. The lower-hood peripheral wall 21.2 extends downwards and cooperates with the upper-hood peripheral wall 20.2 to define the lateral bounds of the distal channel section 16.1. The annular laminator panel 17 is secured on the lower-hood peripheral wall 21.2 so that the annular laminator panel 17 rotates with the relevant rotor 13 in the same way as the lower hood 21.

The laminator panels 17 of the corresponding transport stars 9.1 and 9.2 are in turn arranged on different horizontal levels. In the illustrated embodiment, the laminator panel 17 of the second transport star 9.2 is on a level above the level of the laminator panel 17 of the first transport star 9.1 so that that the two laminator panels 17 can move past each other in the transfer area 15.

As shown in FIGS. 2 and 4, the openings 18 are provided only at container transport positions 14.1. Preferably, the openings 18 are arranged such that they form, on each container transport position 14.1, an annular or sieve-like arrangement or group 22. Each group 22 defines a circular region that is centered at the container transport position 14.1.

Sterile fluid emerges from the openings 18 in each group 22. This sterile fluid flows mainly along the outer surface of the relevant container 2 from the top down. It does not, in any substantial way, make its way into the interior of the container 2. The groups 22 are formed such that, whenever the container transport positions 14.1 reach the transfer area 15, the openings 18 of the laminator panels 17 at the transfer area 15 align sufficiently to allow unimpeded downward flow of sterile fluid.

The third transport star 9.3 is made in the same way as the first and second transport stars 9.1, 9.2. Insofar as the second container-transport section 10 comprises multiple transport stars following each other in the container transport direction, they are adjacent to each other in the same way as the first and second transport stars 9.1, 9.2.

The first container-transport section 8 described herein comprises only the first and second transport stars 9.1, 9.2 following each other in the container transport direction. Embodiments are also possible in which the corresponding container-transport section is formed from three or more than three transport stars adjacent to each other in the container transport direction. It should be apparent, however, that the structure described for the first and second transport stars 9.1, 9.2 can be repeated indefinitely for any pair of adjacent transport stars in series.

FIGS. 5-8 show, as a further embodiment, a first container-transport section 8 that comprises a first transport star 9.1 and a fourth transport star 9.4 following each other and adjacent to each other in the container transport direction. The fourth transport star 9.4 forms a container inlet of a container-handling machine, such as the filling machine 4.

Figure 6:
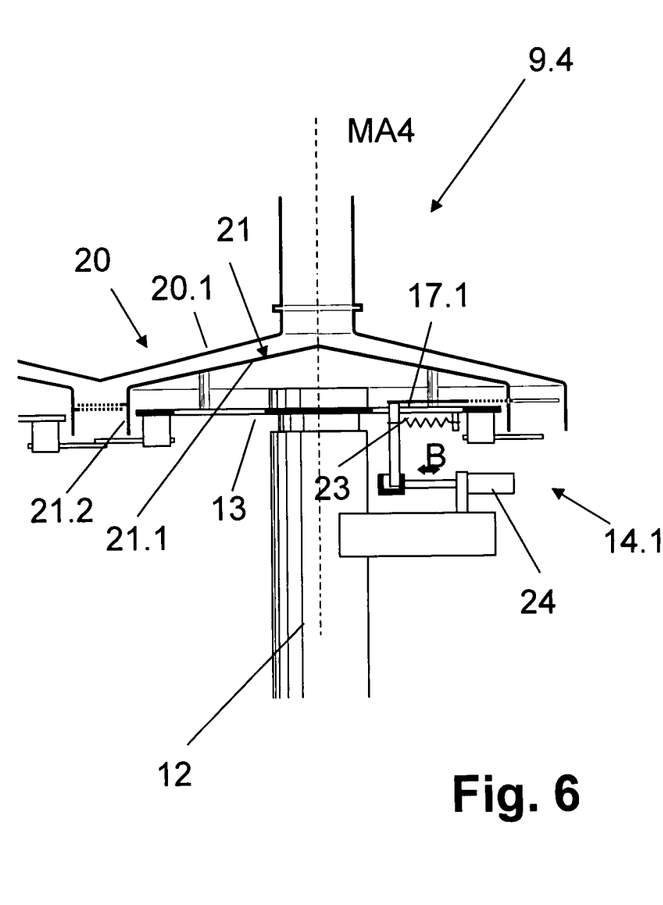
FIG. 6 is a vertical section through one of the two transport stars in FIG. 5.
Figure 7:
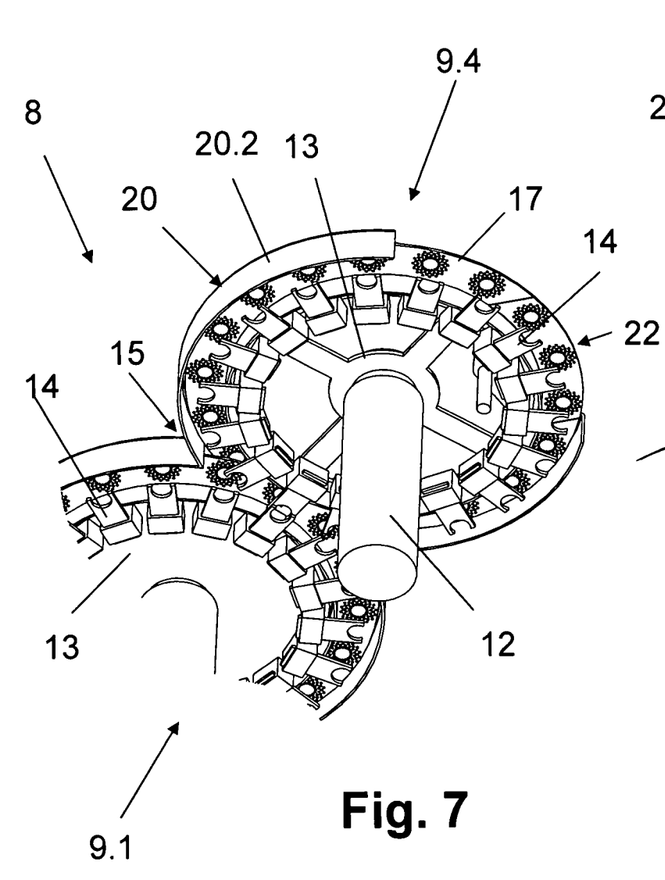
FIGS. 7 and 8 are perspective views of the two transport stars in FIG. 5 seen from below in various operating statuses.
Figure 8:
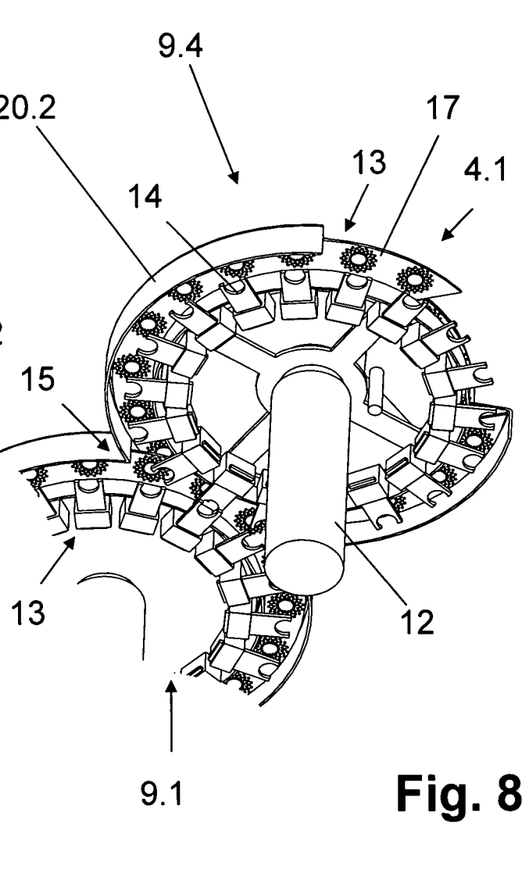

Unlike the second transport star 9.2, the fourth transport star 9.4 has a laminator panel 17 that has radially-movable segments 17.1, best seen in FIG. 6. These radially-movable segments 17.1 can be moved in a direction radial to a third vertical machine axis MA4, which is the machine axis of the fourth transport star 9.4.

A radially-movable segment 17.1 moves between a normal outer position and an inner position. In the normal outer position, the openings 18 are above the associated transport positions 14.1 in the distal channel section 16.1. In the inner position, in which the radially-movable segment 17.1 is moved radially inwards relative to the third machine axis MA4, the openings 18 are outside the distal channel section 16.1 and inside the lower-hood peripheral wall 21.2, as is indicated by the double arrow B in FIG. 6.

In the illustrated embodiment, a spring 23 biases the radially-movable segments 17.1 into the outer position. The movement of a particular radially-movable segment 17.1 into the inner position occurs when an actuator 24, such as a pneumatic cylinder, interacts with a carrier 25 provided on the radially-movable segment 17.1 and is located in the area of the filling machine container inlet 4.1 between the transport star 9.4 and the filling machine 4.

The rotor 13 is rotated so that a relevant radially-movable 17.1 is at the angular position in which the actuation element 24 is arranged. The rotor 13 is then held in this angular position so that the actuator 24 can move the radially-movable segment 17.1 into the inner position.

As advantage of the foregoing segmented design of the laminator panel 17 becomes apparent when attempting to clean and/or disinfect the transport star 9.4 and adjacent components of the system 1, such as the filling machine 4. Without this feature, during CIP cleaning and/or CIP sterilization of the filling machine 4 in the area of the container transfer 4.1 from the first container-transport section 8 to the filling machine 4, the laminator panel 17 would possibly collide with rinsing caps or other seals provided on filling elements of the filling machine 4 for the CIP cleaning and/or CIP sterilization. Such collisions are avoided by moving the relevant radially-movable segment 17.1 arranged at the filling machine container inlet 4.1 between the transport star 9.4 and the filling machine 4.

Figure 9:
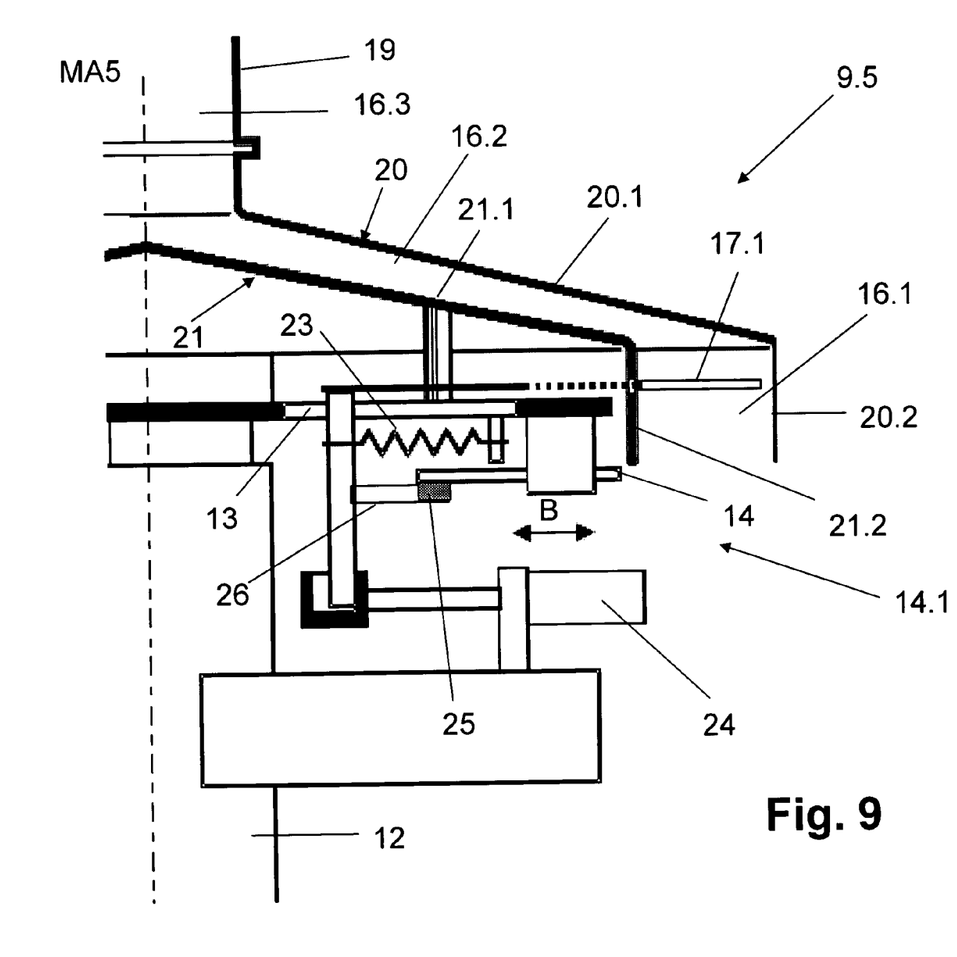
FIG. 9 is a partial representation, similar to FIG. 6, of a further embodiment.

FIG. 9 shows another embodiment that has a fifth transport star 9.5. In the fifth transport star 9.5, clamps 14 allocated to a particular radially-movable segment 17.1 can be moved relative to a fourth machine axis MA5 between an outer normal position and an inner position. In the inner position, the clamps 14 are located below the lower hood 21, as indicated by the double arrow B. The clamps 14 are thus routed in a radially-displaceable manner radially on the rotor 13 for movement in a radial direction relative to the machine axis MA5. A ring segment 26 and linkage connect the clamps 14 so they can be driven by the carrier 25. In some embodiments, the radially-movable segments 17.1 and the allocated clamps 14 can only be moved together. In others, they can move independently of each other.

In a preferred embodiment of the invention, the laminar flow system extends across the various container-handling machines, i.e. in the blow-molding machine 3, in the filling machine 4 and in the sealing machine 5. As a result, containers 2 are permanently exposed to a flow of downwardly directed sterile fluid, from their manufacture through to their sealing.

To achieve the foregoing distribution of sterile fluid, a faceplate 17.2 is provided in the blow-molding machine 3 above the containers, in the filling machine 4 and in the sealing machine 5. This faceplate 17.2, which corresponds to the laminator panel 17, is moved with a circulating transport element or rotor of the particular container-handling machine. The faceplate 17.2 preferably has the outlet openings for the sterile fluid, corresponding to the openings 18. These outlet openings are concentrated only on the container transport and/or handling positions of these machines or at these positions.

The invention was described above using example embodiments. It is clear that modifications and variations are possible without thereby departing from the inventive idea underlying the invention.

For example, it is possible to make the laminator panel 17 have radially-movable segments 17.1 only in a partial area thereof. In this case, it would be important to position the relevant transport star for CIP cleaning and/or sterilization in an angularly accurate manner so that the overlapping or transfer area is held between the container handling machine to be cleaned and the fifth transport star 9.5 in a way that avoids interference from the laminator panel 17 of the fifth transport star 9.5.

In other embodiments, other transport stars have at least one radially-movable segment 17.1.

In yet other embodiments, container carriers other than clamps or tongs can also be used.

Having described the invention, and a preferred embodiment thereof, what is claimed as new, and secured by letters patent is:

1. An apparatus for conveying containers, said apparatus comprising a first transport star, a plurality of transport positions, and a laminar-flow system, wherein said first transport star comprises a rotor that rotates around a machine axis, wherein said transport positions are disposed around said first transport star, wherein each transport position comprises a container carrier to hold a container, wherein said laminar-flow system is configured to prevent container contamination while containers are disposed on said transport positions, wherein said laminar-flow system is disposed above said container carriers, wherein said laminar-flow system is above a trajectory of said containers, wherein said laminar-flow system comprises outlet openings, and wherein said outlet openings are configured to direct a fluid stream of sterile medium downward along outer surfaces of said containers, said apparatus further comprising a faceplate, and a channel, wherein said faceplate rotates with said transport star, wherein said channel supplies and distributes said sterile medium, wherein said outlet openings are disposed on said faceplate, wherein said outlet openings are divided into groups, and wherein each group extends above at most one transport position.

2. The apparatus of claim 1, wherein said outlet openings are divided into groups, wherein each group comprises a ring of outlet openings, wherein said ring extends above at most a first transport position from said plurality of transport positions, wherein said ring encloses an axis of said first transport position, and wherein said axis of said first transport position is parallel to said machine axis.

3. The apparatus of claim 1, further comprising walls defining an annular space, wherein said annular space extends along a trajectory of said transport positions, wherein said outlet openings are disposed in said annular space, and wherein, in operation, container mouths held in said transport positions extend into said annular space.

4. The apparatus of claim 1, wherein said laminar-flow system comprises a channel, wherein said channel comprises a first channel section, a second channel section, and a third channel section, wherein said channel is configured for supplying and distributing said sterile fluid from a source of said sterile fluid to said outlet openings, wherein said first channel section forms an annular space into which, in operation, container mouths protrude, wherein said third channel section is coaxial with said machine axis, wherein said second channel section is between said first and third channel sections, and wherein said second channel section is oriented to distribute fluid in a radial direction from said third channel section to said first channel section.

5. The apparatus of claim 1, further comprising a channel for distributing sterile fluid, wherein said channel is formed at least in part between a first wall and a second wall, wherein said second wall rotates with said rotor, wherein said first wall is at a first distance from said machine axis, wherein said second wall is at a second distance from said machine axis, and wherein said second distance is less than said first distance.

6. The apparatus of claim 5, wherein said first wall is mounted on a machine rack, and wherein said first wall is stationary.

7. The apparatus of claim 1, further comprising a channel for distributing sterile fluid, wherein said channel is formed at least in part between a first wall that defines an outer cone having a cone axis that is parallel to said machine axis and a second wall that defines an inner cone that is coaxial with said first cone and that cooperates with said first cone to define an annular gap that is coaxial with said machine axis and with said cone axis and in which said outlet openings are disposed, wherein a base of said outer cone intersects said cone axis at a first point that is a first distance from a vertex of said outer cone, and wherein a base of said inner cone intersects said cone axis at a second point that is a second distance from said vertex of said outer cone, said second distance being greater than said first distance.

8. The apparatus of claim 7, further comprising an inner circumferential wall and an outer circumferential wall, both of which are coaxial with said cone axis, both of which extend in a direction parallel to said cone axis, and wherein said inner and outer circumferential walls define an annular space below said annular gap.

9. The apparatus of claim 8, wherein said outer circumferential wall comprises a first opening for enabling passage through said outer circumferential wall in a radial direction and a second opening for enabling passage through said outer circumferential wall in a radial direction, wherein said first opening is located at a transport star inlet, and wherein said second opening is located at a transport star outlet.

10. The apparatus of claim 1, wherein said outlet openings are disposed in a faceplate, wherein said faceplate is disposed on a movable segment that is radially movable relative to said machine axis, whereby said outlet openings can be removed from normal positions thereof above a transport position.

11. The apparatus of claim 10, wherein said container carrier is movable between a first position and a second position, wherein, in said first position, said container carrier is arranged at an associated transport position from said plurality of transport positions, wherein, in said second position, said container carrier is located outside said associated transport position.

12. The apparatus of claim 11, wherein movement of said container carrier and said segment are configured such that movement of said segment and movement of said container carrier occur together.

13. The apparatus of claim 1, further comprising a first container-handling machine, a second container-handling machine, and a container transport section between said first and second container-handling machines, wherein said transport star is a constituent of said container transport section.

14. The apparatus of claim 13, further comprising a second transport star, and a container transfer area, wherein said second transport star is adjacent to said first transport star, wherein said container transfer area is disposed where said first transport star meets said second transport star, wherein said first transport star comprises a first faceplate having said outlet openings thereon, wherein said second transport star comprises a second faceplate having outlet openings thereon for discharge of sterile medium, wherein said first faceplate is offset along said machine axis relative to said second faceplate, wherein when said first faceplate and said second faceplate are concurrently in said container transfer area, said outlet openings in said first faceplate and said outlet openings in said second faceplate align sufficiently to enable passage of sterile air both said outlet openings in said first faceplate and said outlet openings in said second faceplate.

15. The apparatus of claim 13, wherein said first container handling machine is a blow-molding machine and said second container handling machine is selected from the group consisting of a filling machine and a sealing machine.

16. The apparatus of claim 15, wherein said laminar-flow system continues into at least one of said container handling machines.

\* \* \* \* \*